United States Patent [19]

Hill et al.

[11] Patent Number: 4,940,875
[45] Date of Patent: Jul. 10, 1990

[54] FORCE LIMITING WELD HEAD

[75] Inventors: William H. Hill, Pala; Joseph E. Donner, Vista, both of Calif.

[73] Assignee: Hughes Aircraft Company, Los Angeles, Calif.

[21] Appl. No.: 313,932

[22] Filed: Feb. 22, 1989

[51] Int. Cl.$^5$ ............................................. B23K 11/30
[52] U.S. Cl. .................................. 219/89; 219/86.61
[58] Field of Search .................. 219/89, 86.7, 91.1, 219/78.01, 86.61, 86.51

[56] References Cited

U.S. PATENT DOCUMENTS

| | | | |
|---|---|---|---|
| 2,785,282 | 3/1957 | Brennen | 219/89 |
| 2,996,603 | 8/1961 | Stolz et al. | 219/89 |
| 3,036,199 | 5/1962 | Page et al. | |
| 3,129,320 | 4/1964 | Capaldo et al. | |
| 3,191,000 | 6/1965 | Nyborg | |
| 3,497,660 | 2/1970 | Henry-Biabaud | |
| 3,889,094 | 6/1975 | Needham | 219/89 |
| 3,978,308 | 8/1976 | Hamby | |
| 4,135,076 | 1/1979 | Beneteau | |
| 4,352,971 | 10/1982 | Slade | |
| 4,680,441 | 7/1987 | McKendrick | |
| 4,733,042 | 3/1988 | Nishiwaki et al. | 219/89 |

Primary Examiner—Clifford C. Shaw
Attorney, Agent, or Firm—Joseph E. Szabo; Wanda K. Denson-Low

[57] ABSTRACT

A force limiting weld head (11) which includes a supporting structure (13), a pressure barrel (15) and an output member (17) mounted for movement on the supporting structure, a fixed electrode (19) mounted on the supporting structure, a movable electrode (21) driven by the output member, a coupling (23) for drivingly coupling the pressure barrel and the output member. The coupling includes a variable-volume chamber (89) and a piston (77) responsive to overtravel for varying the volume of the chamber.

10 Claims, 3 Drawing Sheets

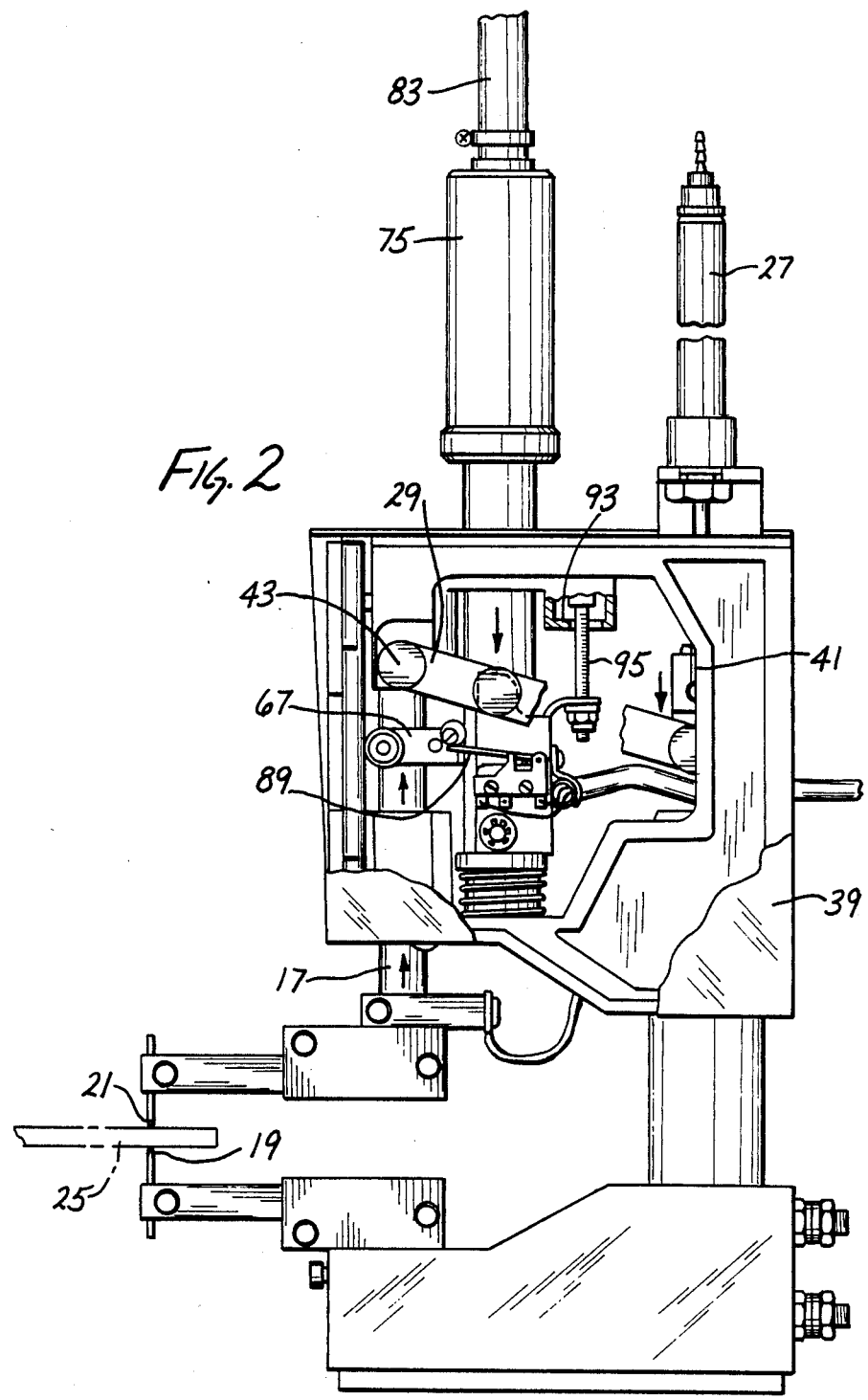

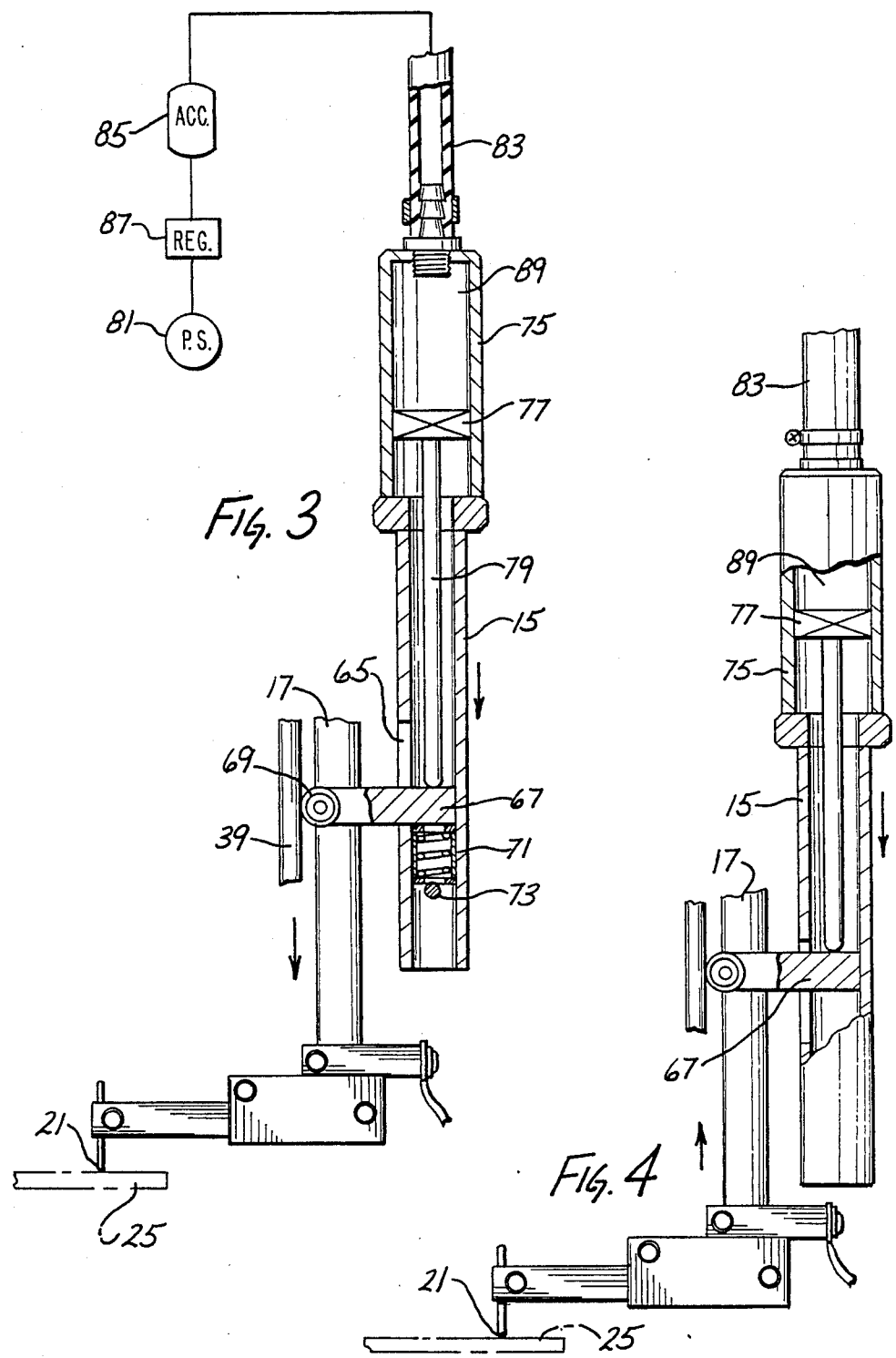

FORCE LIMITING WELD HEAD

BACKGROUND OF THE INVENTION

1. Field of the Invention

This invention relates to a welding apparatus and, more particularly, to a control system which allows overtravel but does not materially increase the force on the electrodes as a result of the overtravel.

2. Description of Related Art

One type of welding apparatus shown, for example, in Nyborg U.S. Pat. No. 3,191,000 includes a supporting structure, a movable member and an output member mounted for movement on the supporting structure, a first electrode mounted on the supporting structure and a movable electrode driven by the output member. Coupling means drivingly couples the output member to the movable member to move the movable electrode toward the fixed electrode so that a workpiece can be contacted by the electrodes and movement of the output member can be arrested. In addition, the coupling means allows the movable member to move relative to the output member to overtravel after movement of the output member is arrested by the workpiece. Accordingly, when the movable member is driven, the output member and the movable electrode are also driven. Means, such as a switch, is responsive to relative movement between the movable member and the output member for energizing the electrodes.

More specifically, the coupling means includes a coil compression spring that is preloaded a predetermined amount to thereby determine the force at which the weld is to be made. The differential motion between the movable member and the output member begins to occur when the force applied by the electrode to the workpiece just exceeds the preload on the spring. This differential motion or overtravel continues to compress the spring, and this increases the force applied to the workpiece by the electrodes above the desired force. Typically, the increase in force may be very substantial and is undesirable.

In an effort to solve the overtravel problem, a hard stop has been used to positively limit the amount of overtravel which can occur. With this construction, the overtravel still creates additional force on the weld, but by limiting the overtravel, it is hoped that the additional force will also be limited. However, the position of the hard stop must be adjusted for each different thickness of workpiece that is to be welded. This is time consuming and creates a possibility that the operator will forget to adjust, or incorrectly adjust, the position of the hard stop each time a different thickness workpiece is to be welded. In addition, the electrodes wear, and so to be effective, the position of the hard stop must be monitored periodically even if the welding apparatus is used continuously on workpieces of the same thickness.

Another attempted solution is to utilize an air cylinder to drive the movable electrode and a regulator set to produce the desired weld force. A problem with this system is that air pressure (weld force) and speed of operation are interdependent adjustments, making force changes more complicated.

SUMMARY OF THE INVENTION

This invention solves these problems. With this invention, overtravel need not be limited, but the tendency of overtravel to cause excessive force on the electrodes and workpiece is essentially nullified.

This can advantageously be accomplished by utilizing an air spring rather than the coil compression spring of the prior art. Unlike the coil compression spring which has a relatively high spring rate, an air spring may be provided which has a very low spring rate during overtravel. Consequently, very little additional output force is developed as the air spring is compressed during overtravel. Although a hard stop can be used with the air spring, a hard stop is not necessary.

It is important to note that the air spring is used, not as an air cylinder to generate the force which is ultimately applied to the electrodes, but rather in the coupling means between the movable member and the output member. When so used, the air spring provides a preset force or preload of the desired amount for the welding operation.

With this invention, the coupling means can advantageously include means defining a variable-volume chamber, a fluid medium in the chamber and means responsive to the overtravel for varying the volume of the chamber. Although the variable-volume chamber can be of various different constructions, it preferably includes a cylinder and a force-responsive element movable in the cylinder in response to the overtravel to vary the volume of the chamber. The force-responsive element may include, for example, a piston, diaphragm or portion of a bellows. The fluid medium is preferably a compressible fluid, such as air.

The preload or preset force is a function of the cross-sectional area of the cylinder and the air pressure. The excess output force generated during overtravel is a function of the cross-sectional area of the air cylinder and the change in pressure caused by movement of the force-responsive element. By minimizing this change in pressure, the excess output force is also minimized.

This can be accomplished by controlling the ratio of the volume ($V_D$) that the force-responsive element displaces during maximum overtravel to the total volume ($V_T$) of the variable-volume chamber when overtravel begins. Although this can be adjusted to suit particular requirements, for many applications, a ratio of $V_D$ to $V_T$ of one to ten is suitable, with a ratio of one to twenty being preferred. Stated differently, the overtravel causes the force-responsive element to move from an initial position in the cylinder in a direction to reduce the volume of the variable-volume chamber, and the reduction in volume of the chamber for the maximum overtravel in the case of the $V_D$ to $V_T$ ratio of 1:10 is no more than about ten percent.

Although the large volume desired can be provided entirely within the cylinder, preferably an accumulator is used. This permits the use of a relatively small-volume cylinder, reduces the overall size of the welding apparatus and allows the accumulator to be remotely located.

Preferably, an adjustable, pressure-relieving regulator is also provided. The pressure regulator is coupled to a source of fluid under pressure and is used to control the preset or preload pressure in the variable-volume chamber. In addition, if the regulator has a pressure-relieving capability, it can serve a pressure-limiting function for the variable-volume chamber to assure that this pressure cannot rise above a threshold.

It is important that the variable-volume chamber not include any restrictions to flow of the fluid medium that would cause any significant pressure rise during overtravel that could result in an undesirable increase in force applied to the electrodes during overtravel. Although the variable-volume chamber may have some compliance or elasticity enabling it to expand in response to increased internal fluid pressure, preferably, the variable-volume chamber is essentially rigid and lacks compliance. Of course, any portion of the chamber defined by polymeric or elastomeric tubing may introduce some small element of compliance into the variable-volume chamber.

The invention, together with additional features and advantages thereof, may best be understood by reference to the following description taken in connection with the accompanying illustrative drawing.

BRIEF DESCRIPTION OF THE DRAWINGS

In the accompanying drawings:

FIG. 2 is a view similar to FIG. 1, with the electrodes in a welding position contacting a workpiece.

FIG. 3 is a fragmentary side elevational view partially in section illustrating certain components of the welding apparatus when the movable electrode first contacts the workpiece.

FIG. 4 is a view similar to FIG. 3 illustrating an overtravel condition.

DESCRIPTION OF THE PREFERRED EMBODIMENT

Figure 1:
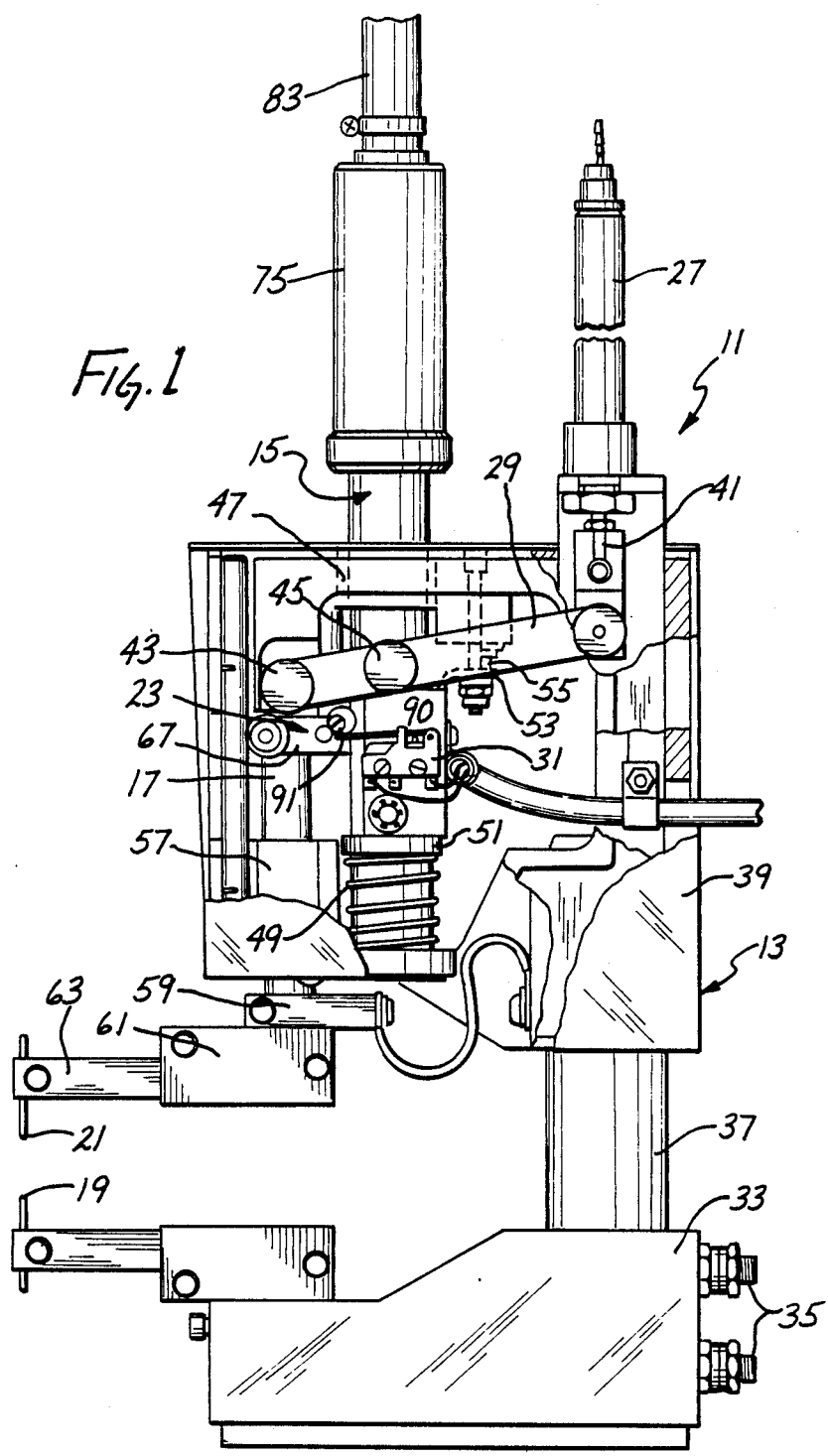
FIG. 1 is a side elevational view with parts broken away illustrating a welding apparatus constructed in accordance with the teachings of this invention and with the electrode in a normal or initial condition.

Referring now to the drawings in more detail, FIG. 1 shows a welding apparatus 11 which includes a supporting structure 13, a movable member in the form of a pressure barrel 15, an output member or shaft 17, a fixed electrode 19 mounted on the supporting structure and a movable electrode 21 driven by the output member 17. The pressure barrel 15 and the output member 17 are mounted for parallel, vertical movement on the supporting structure 13. Coupling means 23 drivingly couples the output member 17 to the pressure barrel 15 and allows the pressure barrel 15 to move relative to the output member 17 or overtravel after movement of the electrode 21 is arrested by contact with a workpiece 25 (FIG. 2).

The welding apparatus 11 also includes means in the form of an air cylinder 27 and a link 29 for driving the pressure barrel 15 to thereby drive the output member 17 and the movable electrode 21. Means in the form of a switch 31 is responsive to relative movement between the pressure barrel 15 and the output member 17 for closing a circuit to supply electrical current to the electrodes 19 and 21.

The supporting structure 13 may be of any suitable construction and, in the embodiment illustrated, is conventional. Thus, the supporting structure 13 includes a base 33 having terminals 35 which can be coupled to a source of electrical energy (not shown) and to the electrodes 19 and 21, a vertically extending post 37 affixed to the base 33 and a frame 39 attached to the upper end of the post.

The air cylinder 27 is of conventional construction and is mounted on the frame 39. The air cylinder 27 has a connecting rod 41 which is pivotally joined to the right end of the link 29 in a conventional manner. The air cylinder 27 can be coupled to a source of air under pressure (not shown) and actuated in a known manner to drive the rod 41 vertically downwardly. The air cylinder can be replaced with other conventional means, such as a cable and foot pedal, for driving the link 29.

The link 29 is pivotally coupled at its left end by a pin 43 to a portion of the frame 39 and is pivotally joined by a coupling 45 intermediate its ends to the pressure barrel 15. Consequently, actuation of the air cylinder 27 pivots the link 29 clockwise as viewed in FIG. 1 about the pin 43.

The pressure barrel 15 is mounted for vertical reciprocating movement on the frame 39 by a bushing 47 carried by the upper end of the frame and another bushing (not shown) carried by the lower end of the frame. A light spring 49 bears against the bottom of the frame 39 and against a collar 51 carried by the pressure barrel 15 to lightly bias the pressure barrel to a normal or initial uppermost position in which a tab 53 carried by the coupling 45 engages a fixed stop 55 on the frame 39 to thereby define the uppermost position of the pressure barrel 15. The details of the pressure barrel 15 and the coupling means 23 are discussed hereinbelow with reference to FIGS. 3 and 4.

The output member 17 is mounted for vertical reciprocating movement on the frame 39 by two bearings 57. A block 59 is carried by the lower end of the output member 17 as is a block 61 which is in turn joined to the electrode 21 by an arm 63.

The apparatus 11 as described hereinabove in the Description of the Preferred Embodiment is essentially conventional. With this invention, the conventional force spring typically found inside the pressure barrel 15 is replaced by a pneumatic system.

The coupling means 23 drivingly couples the pressure barrel 15 to the output member 17 so that downward movement of the pressure barrel also drives the output member downwardly. However, when downward movement of the output member 17 is arrested by the workpiece 25 (FIG. 2), the coupling means 23 then allows continued downward movement or overtravel of the pressure barrel 15 without transmitting any significant additional downward force to the output member 17. In this respect, this invention departs from the prior art.

This is preferably accomplished by the construction shown in FIGS. 3 and 4 where it can be seen that the pressure barrel 15 is in the form of a hollow tube having a longitudinal slot 65 therein. A bracket or yoke 67 is fixedly attached to the output member 17 and projects through the slot 65 into the interior of the pressure barrel 15. One or more bearings 69 are rotatably mounted on the yoke 67 and rotate against a guide rod mounted on the frame 39 as the yoke 67 is moved vertically.

A tare spring 71 within the pressure barrel 15 acts between a transverse pin 73 affixed to the pressure barrel and the underside of the yoke 67 to urge the bracket upwardly as viewed in FIG. 3. The spring 71 supports the weight of the moving components acting downwardly on the pressure barrel 15.

A cylinder 75 is suitably mounted on the upper end of the pressure barrel 15 and has an open bottom so that the cylinder can communicate with the interior of the pressure barrel. A force-responsive element in the form of a piston 77 is slidable vertically in the cylinder 75, and a force-transmitting rod 79 is coupled to the piston 77 and extends through a portion of the pressure barrel 15 into engagement with the yoke 67.

In order to transmit downward motion from the pressure barrel 15 to the output member 17, it is necessary to apply fluid pressure to the side of the piston remote from the yoke 67, i.e., the upper side as viewed in FIG. 3. In this embodiment of the invention, this pressure is provided by a source 81 of air under pressure which is coupled to the cylinder 75 by tubing 83. An accumulator 85 and a regulator 87 are interposed between the cylinder 75 and the source 81. The regulator 87, which may be of conventional construction, receives air under pressure from the source 81 and reduces it to a desired level in the circuit downstream of the regulator. This pressure is set so that, when multiplied by the area of the piston 77, it provides a preset load or preload downwardly through the rod 79 against the yoke 67. Consequently, when movement of the movable electrode 21 is arrested by the workpiece 25 and downward movement of the pressure barrel 15 continues, this preset load is transmitted through the electrode 21 to the workpiece.

The volume of the cylinder 75 above the piston 77, the tubing 83, the accumulator, the tubing between the accumulator 85 and the regulator 87, and the piston 77 define a variable-volume chamber 89, the volume of which can be varied by the piston 77. In this embodiment, the volume of the accumulator 85 is preferably large when compared with the volume of the cylinder 75 above the piston. Specifically, in this example, the volume of the chamber 89 when overtravel begins equals twenty times the volume that the piston displaces during the maximum possible overtravel. The maximum overtravel may be established in various ways, such as by the maximum travel of the rod 41 of the air cylinder 27 or by a stop.

When overtravel begins, the pressure barrel 15 moves relative to the output member 17. This relative motion is sensed by the switch 31 in a known manner. Specifically, the switch includes an arm 90 (FIG. 1) which bears on the lower side of a pin 91 carried by the yoke 67. Accordingly, relative vertical motion between the pressure barrel 15 and the output member 17 pivots the arm 90 as shown in FIG. 2 to actuate the switch 31. Actuation of the switch closes a circuit to supply electrical energy to the electrodes 19 and 21.

Prior to operation of the welding apparatus 11, the components are in the initial position shown in FIG. 1. After a workpiece 25 is positioned between the electrodes 19 and 21 (FIG. 2), the operator actuates the air cylinder 27 to pivot the link 29 clockwise as viewed in FIG. 1 about the pin 43 to thereby drive the pressure barrel 15 downwardly by virtue of the coupling 45 which couples an intermediate region of the link to the pressure barrel. With the proper pressure above the piston 77 (FIG. 3), the downward motion of the pressure barrel 15 is transmitted through the piston 77, the rod 79 and the yoke 67 to the output member 17 so that the output member and the electrode 21 carried thereby move downwardly. When the movable electrode 21 contacts the workpiece 25, downward movement of the electrode 21 and the output member 17 is arrested. The slot 65 allows the pressure barrel 15 to move downwardly relative to the yoke 67, and this relative movement actuates the switch 31 as described above to apply welding energy to the electrodes. Continued downward motion of the pressure barrel 15 moves the cylinder 75 downwardly over the piston 77 to reduce the volume of the chamber 89 above the piston. However, because the volume of the chamber 89 above the piston 77 is large in comparison with the volume of the cylinder 75 that is displaced during overtravel, there is only a very slight compression of the air within the chamber 89. This very slight compression of the air results in only an inconsequential increase in the force applied to the electrodes 19 and 21 and the workpiece 25. Consequently, the overtravel does not result in undesirable force being applied to the electrodes 19 and 21 and the workpiece 25. In this embodiment, the maximum downward travel of the pressure barrel 15 is limited by the maximum stroke of the rod 41 of the air cylinder 27. However, this function could be carried out by a conventional hard stop 93 (FIG. 2) and associated screw 95 coupled to the link 29, although this is not preferred.

Although an exemplary embodiment of the invention has been shown and described, many changes, modifications and substitutions may be made by one having ordinary skill in the art without necessarily departing from the spirit and scope of this invention.

We claim:

1. In a welding apparatus including a supporting structure, a movable member and an output member mounted for movement on the supporting structure, a first electrode mounted on the supporting structure, a movable electrode driven by the output member, coupling means for drivingly coupling the output member to the movable member to move the movable electrode toward the fixed electrode whereby a workpiece can be contacted by the electrodes and can arrest movement of the output member and for allowing the movable member to move relative to the output member to overtravel after movement of the output member is arrested by the workpiece, means for driving the movable member to thereby drive the output member and the movable electrode, and means responsive to relative movement between the movable member and the output member for energizing the electrodes, the improvement comprising:
said coupling means including means defining a variable-volume chamber, a fluid medium in said chamber and means responsive to the overtravel for varying the volume of the chamber.

2. An improvement as defined in claim 1 wherein the means defining a variable-volume chamber includes a cylinder at least partly defining the chamber and a force-responsive element movable in the cylinder in response to the overtravel to vary the volume of the chamber.

3. An improvement as defined in claim 2 wherein the means defining a variable-volume chamber includes an accumulator in fluid communication with the cylinder and defining a portion of the chamber.

4. An improvement as defined in claim 2 wherein the means for varying includes a force-transmitting rod coupled to the force-responsive element and extending through a portion of the movable member.

5. An improvement as defined in claim 2 wherein the cylinder is carried by the movable member.

6. An improvement as defined in claim 2 wherein there is a maximum amount of overtravel possible, the overtravel causes the force-responsive element to move from an initial position in the cylinder in a direction to reduce the volume of the variable-volume chamber and the reduction in volume of the variable-volume chamber for maximum overtravel is no more than about ten percent.

7. An improvement as defined in claim 6 including a pressure regulator for regulating the pressure in the variable-volume chamber and wherein the means defining a variable-volume chamber includes an accumulator in fluid communication with the cylinder and defining a portion of the chamber.

8. An improvement as defined in claim 1 wherein there is a maximum amount of overtravel possible and the reduction in volume of the variable-volume chamber for the maximum overtravel is no more than about five percent.

9. An improvement as defined in claim 1 including a pressure regulator in communication with said variable-volume chamber for regulating the pressure in the variable-volume chamber.

10. An improvement as defined in claim 9 wherein the defining means includes an accumulator in communication with other portions of said chamber.

* * * * *